Figure 1:
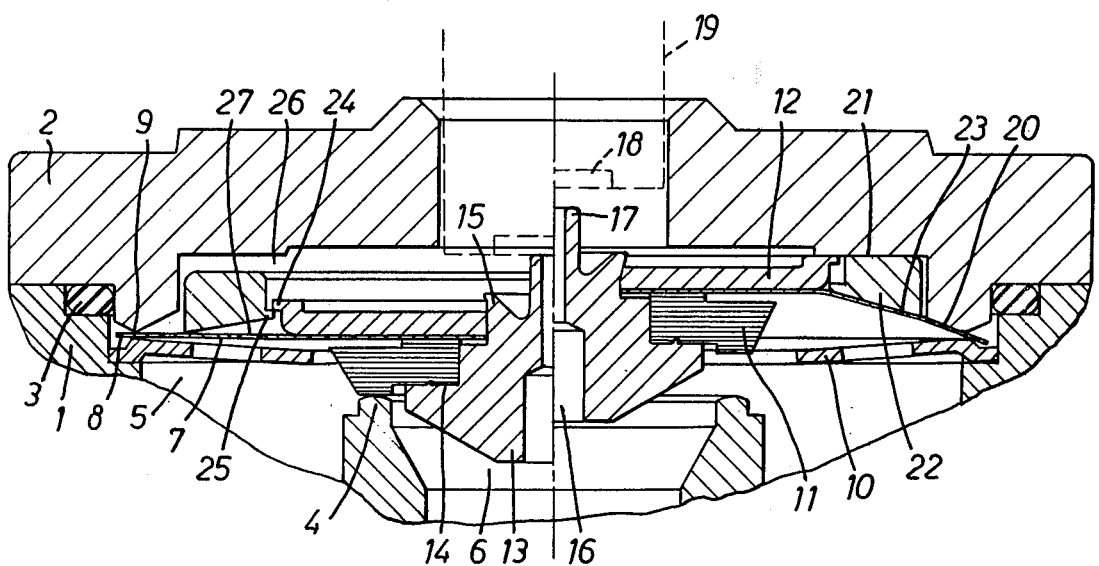

United States Patent [19]
Engberg

[11] 3,946,983
[45] Mar. 30, 1976

[54] VALVE WITH A CLOSING MEMBER ACTUATED BY WAY OF A DIAPHRAGM

[75] Inventor: Lorenz Asmus Engberg, Sonderborg, Denmark

[73] Assignee: Danfoss A/S, Nordborg, Denmark

[22] Filed: Aug. 7, 1974

[21] Appl. No.: 495,385

[52] U.S. Cl. .................. 251/61.2; 92/100; 92/101; 251/30
[51] Int. Cl.² .................................... F16K 31/385
[58] Field of Search ...... 251/30, 129, 141, 61, 61.2; 92/98 R, 99, 100, 101, 102

[56] References Cited
UNITED STATES PATENTS

| | | | |
|---|---|---|---|
| 748,944 | 1/1904 | Grouvelle et al. | 92/101 |
| 2,940,722 | 6/1960 | Vargo | 251/30 |
| 3,079,952 | 3/1963 | Miller | 251/30 |
| 3,103,338 | 9/1963 | Marmo | 251/30 |
| 3,240,128 | 3/1966 | Wilson | 92/99 |
| 3,363,433 | 1/1968 | Barbier | 251/30 |
| 3,414,235 | 12/1968 | Lumpp | 92/99 |

Primary Examiner—Martin P. Schwadron
Assistant Examiner—G. L. Walton

[57] ABSTRACT

The invention relates to a pilot controlled, magnetic type of valve having a diaphragm with the outer edge floatably attached to the housing. Excessive deformation of the diaphragm is prevented by providing a supporting ring which is axially movable in relation to the body of the valve and has a conical surface which is engaged by the diaphragm and to which the diaphragm conforms when the valve is in an open position.

2 Claims, 2 Drawing Figures

U.S. Patent    March 30, 1976    3,946,983

VALVE WITH A CLOSING MEMBER ACTUATED BY WAY OF A DIAPHRAGM

The invention relates to a valve with a closing member actuated by a pressure medium and by way of a diaphragm, the latter, when pressure-loaded, being supported at its marginal zone by a shaped surface integral with the casing, and at its central zone by a movable supporting plate supported by the housing, especially a pilot-controlled magnetic valve with a diaphragm, the edge of which is so held as to be able to float.

A valve of this kind is known in which there extends through the closing member and the supporting plate a nozzle, that opening of which facing away from the valve seat together with a closing member fitted on the armature of an electro-magnet forms a pilot valve. Furthermore, the diaphragm is provided with a throttle orifice. When the pilot valve is closed, the inlet pressure acts on the entire surface of the diaphragm through the throttle orifice, so that the main closing member is held firmly on the seat. When however the pilot valve is opened, the discharge pressure obtains above the diaphragm. Then, the force of the delivery pressure obtaining outside the valve seat predominates. The diaphragm is lifted and the main valve opens. During this pressure loading, the edge of the diaphragm lies on an inclined shaped surface of the housing and its central part lies on a supporting plate which is concentrically secured to the diaphragm and which is likewise supported on the housing after a predetermined distance of travel.

With this arrangement however the following problem arises: in the closed position, that part of the diaphragm lying between the periphery of the supporting plate and the marginal holding means is not supported. As soon as it is exposed to pressure loading it deflects until part of it bears against the shaped surface. This is particularly so in the case of diaphragms, the edges of which are not firmly clamped for reasons of greater mobility, and which can therefore move in the radial direction. The deformation associated with frequent deflection leads to a corresponding shortening of the service life of the diaphragm. This point is of particular importance if the diaphragm is exposed to the action of a corrosive medium, for example a refrigerant, and for this reason the material of the diaphragm may not be freely selected, for example, with good deformation properties in mind. Nor is it possible to increase the diameter of the supporting plate in order to reduce the free zone of the diaphragm that could deflect, since then it would not be possible to obtain the required stroke without severely deforming the material of the diaphragm.

It is also known to increase the rigidity of the diaphragm by a spring disc which is clamped at the middle between the supporting plate and the diaphragm and the edge of which is supported on the shaped surface. This quite advantageous solution cannot however be used in cases where it is required that a resilient stiffening means should alter the deformation characteristics of the material of the diaphragm as little as possible, or at least should not alter them over the entire surface of the diaphragm.

The object of the present invention is to provide a valve of the initially described kind in which excessive deformation of the diaphragm is prevented.

According to the invention this object is achieved in that at least one supporting ring movable in relation to adjacent parts is disposed between the shaped surface and the supporting plate, which ring, after moving a shorter distance than the supporting plate, is supported on the housing, and which ring is prevented by restricting means from moving substantially more rapidly than the supporting plate.

This interposed supporting ring prevents unrequired deflection of the zone of the diaphragm outside the supporting plate. This occurs on the one hand because the supporting ring, by bearing on the housing, has a specific end position which can be selected to suit the required form of diaphragm, while on the other hand the supporting ring cannot deflect too rapidly during its movement, that is to say the ring is always in a certain positional relationship with the supporting plate, which relationship still permits deformation of the diaphragm.

A particularly simple arrangement is obtained if the restricting means, during travel of the supporting ring, couple it with the supporting plate so that it drives the plate. Prior to the supporting ring encountering the housing, the ring moves in unison with the supporting plate, and there is obtained a two-stage deformation of the diaphragm which inhibits any curvature. In the first stage the zone outside the supporting ring is deformed, whereas in the second stage the zone below the supporting ring is deformed.

In the simplest case, the restricting means consist of an abutment on the supporting plate and of a driving element, acting in the opening direction, on the supporting ring. The forces acting on the supporting ring are thereby transmitted to the supporting plate, so that the closing member is able, on the whole, to move away more rapidly from the seat.

In a preferred form of construction, the supporting ring has an inclined face which, in the end position of the ring, supplements the shaped surface integral with the housing. The least load on the diaphragm occurs if the face thus formed is part-spherical.

The movement of the supporting ring may be restricted in another manner, for example by means of a damping device adapted to the movement of the supporting plate. Also, the speed of movement of the supporting ring may be different from that of the supporting plate; if it is approximately half as great as that of the plate, and if the stroke of the supporting plate is twice as great as that of the supporting ring, all the parts can be caused to reach their end positions approximately simultaneously.

Figure 2:
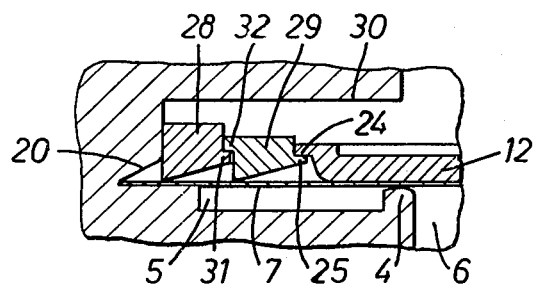

The invention will now be described in greater detail by reference to preferred forms of construction illustrated in the annexed drawing, in which:

FIG. 1 is a cross-section through part of a valve in accordance with the invention and having one supporting ring, and FIG. 2 shows diagrammatically the arrangement of a second supporting ring.

FIG. 1 illustrates a valve housing which consists of a lower part 1 and an upper part 2 which are fitted together with a seal 3 between them. A main valve seat 4 is also fitted on the lower part 1. Outside the seat 4 is the delivery chamber 5 and within it the discharge chamber 6.

The delivery chamber 5 is bounded by a diaphragm 7. The edge 8 of the diaphragm is held between an edge 9 of the upper part 2 and a clamping member 10 so that the diaphragm is able to float. At its centre the diaphragm carries a closing member 11 co-operating with the seat 4. The central part of the diaphragm is covered by a supporting plate 12. Between its clamping face 14 and its projecting edge 15, a member 13 firmly clamps the closing member 11, the diaphragm 7 and the supporting plate 12. The member 13 has a central jet orifice 16, the upper end 17 of which, constituting the seat of a pilot valve, co-operates with a closing member 18 which is carried by the armature 19 of a magnetic valve. The parts 18 and 19 are shown in broken lines only.

The upper part 2 has at its edge a shaped surface 20 against which the edge of the diaphragm bears, and farther inwards the upper part has a bearing face 21 for providing a backing for the supporting plate 12 and a supporting ring 22. This supporting ring 22 is disposed between the supporting plate 12 and the shaped surface 20. The ring nas in turn an inclined face 23 on which bears the diaphragm and which, in the end position shown in the right-hand half of FIG. 1, forms a continuation of the shaped surface 20 and forms therewith a part of a spherical surface. The supporting plate 12 has an abutment 24 with which co-operates a driving element 25 integral with the supporting ring 22. The supporting plate and the supporting ring are disposed in a pressure chamber 26 which communicates with the delivery chamber 5 via a throttle orifice 27 in the diaphragm 7.

When the pilot valve is closed, i.e. when the closing member 18 on the magnet armature 19 lies against the valve seat 17 (left-hand half of FIG. 1), the same pressure obtains in the pressure chamber 26 as in the delivery chamber 5 on account of the connection by way of the throttle orifice 27. The diaphragm is therefore relieved of pressure outside the valve seat 4, whereas the part disposed within the cross-section of the valve seat is stiffened to a satisfactory extent by the supporting plate 12, the closing member 11 and the member 13. If the pilot valve now opens because of the lifting of the closing member 18, the pressure in the pressure chamber 26 is relaxed relatively rapidly through the nozzle duct 16 since the resistance of this duct is considerably lower than that of the throttle orifice 27. Consequently the pressure in the pressure chamber 26 drops to a level that is slightly lower than the delivery pressure. As a result, the central part of the diaphragm is loaded in the downward direction, whereas that part of the diaphragm disposed outside the seat 4 is pressed firmly upwards. When this is happening, that part of the diaphragm 7 disposed between the outer periphery of the plate 12 and the edge 9 is additionally supported by the supporting ring 22. Since the latter is constrained by way of the driving element 25 and the abutment 24 on the supporting ring 12, the position of the supporting ring 22 in relation to the supporting plate 12 is initially maintained. The force acting on the supporting ring 22 causes the supporting plate and therefore the closing member 11 to lift from the seat 4. Consequently, only that part of the diaphragm below the shaped surface 20 is initially deformed. When the supporting ring 22 encounters the bearing face 21, the supporting plate 12 moves farther upwards. Then, that part of the diaphragm disposed below the supporting ring 22 deforms. When the supporting plate 12 has reached its end position (right-hand half of FIG. 1), an almost continuous part-spherical supporting surface is provided for the diaphragm.

In the form of construction illustrated, the diaphragm is made of tetrafluoroethylene. The valve acts as a pilot-controlled magnetic valve for a refrigerant.

It is also possible to provide more than one supporting ring. FIG. 2 illustrates the diaphragm 7 with a supporting plate 12, over a valve seat 4. Between the shaped surface 20 and the supporting plate 12 there are provided two supporting rings 28 and 29. With these, as with the supporting plate 12, there is associated a common bearing surface 30. The supporting ring 28 has a driving element 31 which co-operates with an abutment 32 on the supporting ring 29. The latter has the previously mentioned driving element 25 which co-operates with an abutment 24 on the supporting plate.

When downward pressure is applied to the diaphragm from below from the delivery chamber 5, the three supporting parts 28, 29 and 12 first move in unison until the supporting ring 28 encounters the bearing surface 30. Then the supporting ring 29 moves jointly with the supporting plate 12 until it encounters the bearing surface 30. Finally only the supporting plate 12 continues to be displaced. The deformation of the diaphragm 7 can be kept correspondingly small.

I claim:

1. A valve unit comprising a valve housing having internal wall means defining an inlet chamber, a discharge conduit in said inlet chamber having a valve seat, a valve assembly including a support plate and a closure member cooperable with said valve seat, said valve assembly having a central orifice, a diaphragm clamped between said closure member and said support plate, said diaphragm having the outer rim thereof floatingly held by said housing, an axially movable ring between said diaphragm and said housing internal wall means, said ring and said internal wall means having generally conical surfaces to which said diaphragm conforms when said valve assembly is in an open position, said conical surfaces being in adjacent and in smoothly merging relation to each other when said valve assembly is in an open position, said ring and said support plate having mutually engageable flange means whereby said ring is forced to trail the movement of said support plate when said valve assembly moves to an open position.

2. A valve unit according to claim 1 including a second ring surrounding said first named ring, said rings having mutually engageable flange means whereby said second ring is forced to trail the movement of said first named ring when said valve assembly moves to an open position.

* * * * *